United States Patent [19]

Skidanenko et al.

[11] Patent Number: 4,536,614

[45] Date of Patent: Aug. 20, 1985

[54] SUPERVISION AND DIAL PULSE DETECTION CIRCUIT FOR A TELEPHONE SUBSCRIBER LINE

[75] Inventors: Constantine V. Skidanenko, Menlo Park; Gregor D. McGibbon, San Carlos, both of Calif.

[73] Assignee: GTE Communication Systems Corporation, Phoenix, Ariz.

[21] Appl. No.: 449,030

[22] Filed: Dec. 13, 1982

[51] Int. Cl.³ .............................................. H04M 3/22
[52] U.S. Cl. ................................................ 179/18 FA
[58] Field of Search ....... 179/16 AA, 16 EA, 18 FA, 179/70, 77, 16 F; 340/825.06; 375/3.00

[56] References Cited

U.S. PATENT DOCUMENTS

| | | | |
|---|---|---|---|
| 3,916,114 | 10/1975 | Persson | 179/81 R |
| 3,935,392 | 1/1976 | Smith et al. | 179/16 EA |
| 4,326,104 | 4/1982 | Bergida | 179/16 AA |
| 4,402,039 | 8/1983 | Jirka | 363/21 |
| 4,429,186 | 1/1984 | Gartner | 179/77 |
| 4,458,112 | 7/1984 | Svala | 179/18 FA |

Primary Examiner—Gene Z. Rubinson
Assistant Examiner—R. Vaas
Attorney, Agent, or Firm—Leonard R. Cool; Russell A. Cannon

[57] ABSTRACT

A floating battery feed circuit employs a single primary winding, a pulse width control circuit and a peak detector for providing a controlled current to a subscriber loop. The amplitude of the controlled current is determined by the loop resistance. A comparator circuit has one input connected to the output of a peak detector via a breakdown diode. The second comparator input is connected to a reference voltage. When the voltage from the breakdown diode exceeds a predetermined value the comparator provides an 0 output to indicate an on-hook state. For a peak detector output voltage below said predetermined value, the comparator provides a +5 volt output indicating an off-hook state.

3 Claims, 5 Drawing Figures

CLOCK OUTPUT WAVEFORM
$\vdash\!\!\!\dashv$ = 1 MICROSECOND AT 24KHz RATE

VT VOLTAGE WAVEFORM
$V_T = -[V_{BAT} + (\frac{N_1}{N_2})V_L]$

CONTROL VOLTAGE VC WAVEFORM
$V_C(t) = [(\frac{-V_{BAT}}{2L_1})R_8] \cdot t$

SECONDARY WINDING VOLTAGE AND RECTIFIER VOLTAGE
$V_L$
$-[(\frac{N_2}{N_1})V_{BAT}]$

SUPERVISION AND DIAL PULSE DETECTION CIRCUIT FOR A TELEPHONE SUBSCRIBER LINE

RELATED APPLICATIONS

This relates to Ser. No. 437,936, filed Nov. 1, 1982 and Ser. No. 449,026, filed Dec. 13, 1982.

BACKGROUND OF THE INVENTION

1. Field of the Invention This invention relates to the identification of on-hook and off-hook states of a telephone subscriber loop, and in particular to apparatus for detecting such states and providing the status information to a local switching office.

2. Background Description

The problem of supplying operating power from a central office to a subscriber telephone set is a continuing one. The arrangements for doing so are variously described as line feed circuits and telephone subscriber line circuits. For the standard telephone circuit te technique for supplying the operating current to the subscriber loop consisted essentially of two resistors which are designated as line feed resistors and these resistors are connected to opposite sides of the central office battery. The voltage amplitude of the battery is in the range of 48 to 60 volts and the line feed resistors typically have resistance values ranging from 200 to 800 ohms depending upon the particular telephone exchange. These line feed resistors are selected at the central office to have a value which would produce the proper line current for the loop resistance characteristic expected by the telephone instrument to which it is to be connected.

Another common technique is by the use of a transformer, the primary of which is connected to the voice frequency circuit. The secondary consists of two windings, the two secondary windings being joined by a blocking capacitor, which provides a low AC impedance for voice frequencies and a high DC impedance. The battery voltage is applied to the one and other terminal ends of the capacitor. One problem with this approach is that loop supervision, i.e., on-hook, off-hook and dial pulsing information could not be detected by using the battery feed circuit. Thus, separate detection circuits are required. These traditional circuits are not energy efficient, because of the excessive loss in the line feed resistors.

More recently, floating battery feed circuits, which are more energy efficient, have been devised. One such circuit is disclosed in the U.S. Pat. No. 4,056,691 entitled, "Telephone Subscriber Line Circuit", L. Freimanis et. al., granted Nov. 1, 1977. In the referenced patent it is clear that the battery feed current is coupled to the telephone instrument from a source of positive and negative potential that "floats" (has a very high impedance) relative to earth ground. The main advantage of this method is that of very good longitudinal balance, which provides good immunity to AC induction. As shown in FIG. 3 of the referenced patent a transformer is included which has, in addition to the normal primary and secondary windings, a plurality of sense windings which are used to ensure a constant current supply to the subscriber loop when the battery feed circuit is turned on. Further, a number of external control circuits are required. For example, a scan flip-flop is used for status checks.

In order to determine the status of a subscriber line, the scan flip-flop is placed in the set state by a controller which is a part of the telephone central office. Off-hook scanning is done at a low frequency to reduce power consumption so the circuit (power circuit) will be activated on a periodic basis by a clock signal. Thus power is supplied to the line at a low periodic rate and a separate sense winding is used to respond to the line voltage and this voltage is applied to a comparator. In the off-hook state the sensed voltage is relatively low, because of the lower impedance presented by the closed loop. The voltage will be considerably higher in the on-hook state when the line impedance is high. Because the sensed voltage could become excessively high under this latter condition, the sense winding is clamped to a supply voltage through a light emitting diode.

In the instant invention the on-hook and off-hook state are identified without requiring a separate scan flip flop, sense winding or clamping circuit.

SUMMARY OF THE INVENTION

In a floating battery feed circuit, which includes a transformer having only a primary and a secondary winding, a pulse width control circuit for providing a controlled loop current during an off-hook condition, the controlled current being a function of reflected voltage from the secondary winding, said reflected voltage being a direct function of the loop resistance, and a circuit for detecting an on-hook or off-hook state that is also responsive to said reflected voltage.

DETAILED DESCRIPTION OF THE INVENTION

A number of the prior art battery feed circuits provide a constant current to the subscriber loop. This means that a significantly high voltage must be available for the longer loops and it also means that the energy expended is significant. Present day telephone sets are designed to perform acceptably if they are provided with loop currents of between 20 and 80 milliamperes. Thus battery feed circuits, including range extenders, should be designed to provide a boosted battery so as to maintain a minimum of 20 milliamperes loop current. Many of the prior art circuits also do not permit the determination of loop status directly from the power feed circuit. Those that do use external information and complex control circuits. In the present invention the loop status is determined directly from the floating battery feed circuit.

Figure 1:
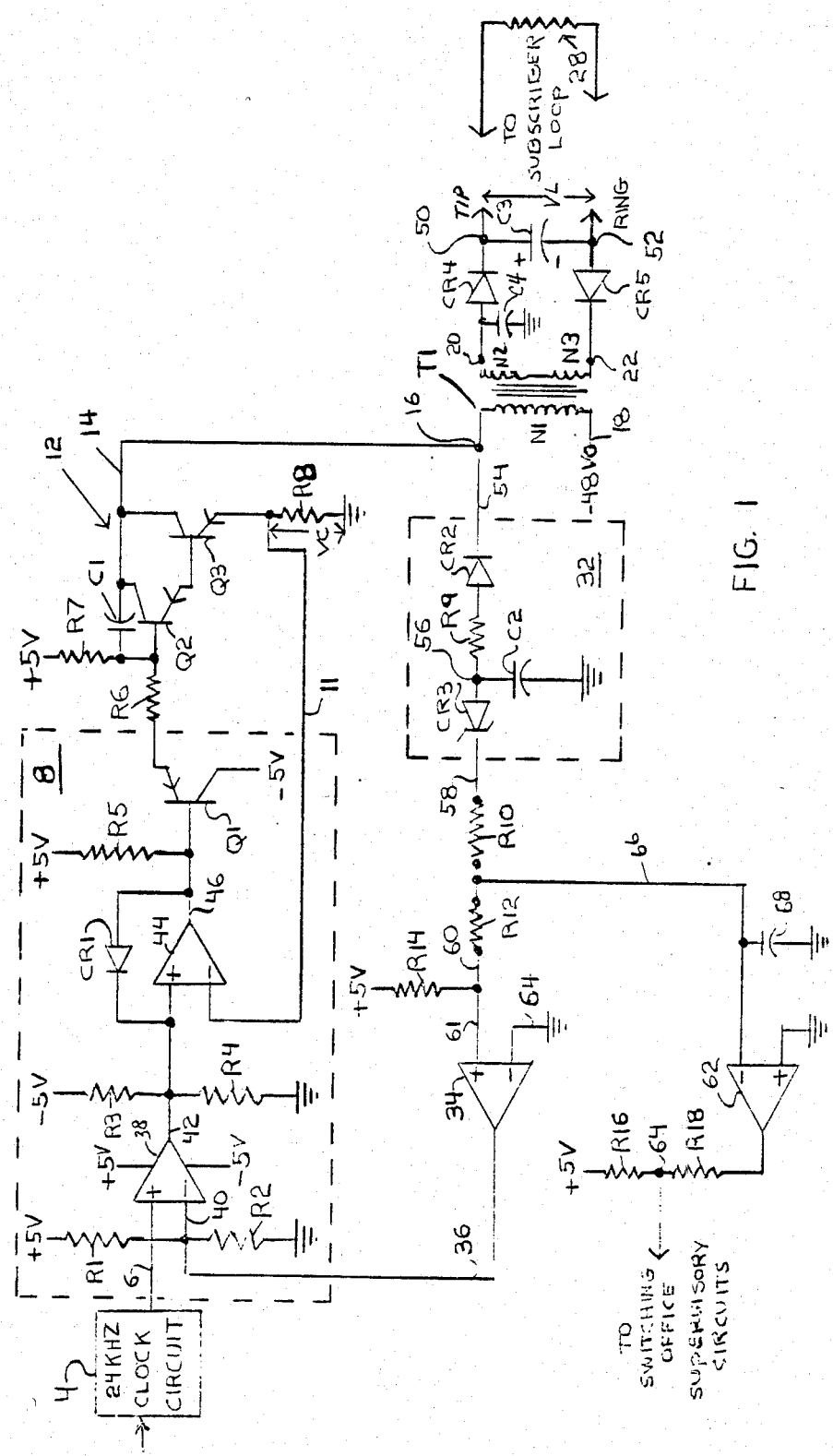
FIG. 1 is a detailed schematic diagram of a preferred embodiment of the invention.

Referring now to FIG. 1 a floating battery feed circuit which permits direct detection of the on-hook and off-hook status of the loop is illustrated. This floating battery feed circuit also inexpensively provides a controlled loop current to the subscriber loop. A clock 4 provides a one microsecond pulse at a 24 kHz rate on path 6. Clock 4 may receive timing information from the local switching office, particularly if it is a digital switching office. Because the common sampling frequency for PCM voice frequency telephone channels is 8 kHz, it is expected that this 8 kHz frequency would be available and could be provided to the synchronizing input of the clock circuit. This provides a significant advantage in that the synchronization of the clock circuit with the local voice frequency sampling rate would preclude the introduction of spurious tones into a PCM coded signal. While the 8 kHz rate could provide for satisfactory operation, a higher clock pulse rate of 24 kHz was employed. The higher frequency allows for easier separtion of the switching frequency from the voice frequency.

As will be explained in detail later, the leading edge of the clock pulse causes the pulse width control circuit 8 to provide drive current on path 10 to trnsistor circuitry 12. Transistor circuit 12 then goes into saturation with current flow between ground and the −48 volt battery connection at terminal 18 of transformer T1. Note that the current flows through the primary winding N1 of transformer T1 via junction 16 and path 14 to the collector of transistor circuit 12. The current flowing through the emitter resistor R8, which is substantially the same as that in path 14, provides the pulse width control voltage VC across resistor R8 and this voltage is fed back to the pulse width control circuit via path 11. When the voltage VC reaches a predetermined value, pulse width control circuit 8 is shut down and the drive to transistor circuit 12 is removed. Operation of pulse width control circuit 8 is considered in more detail in copending application (D-24,237), Ser. No. 437,936, filed Nov. 1, 1982.

When the current begins to rise in the primary winding N1 of transformer T1, it increases in a substantially linear fashion, and this can be observed as a ramp voltage across resistor R8. The current in the winding will continue to rise until the voltage VC reaches a predtermined value and the base drive to transistor 12 is turned off. At this point, the energy stored in the primary N1 winding must be dissipated, and the collapsing field will induce a voltage into the secondary winding which is rectified by diode CR4. The rectified voltage is stored in capacitor C3. This stored voltage is represented as VL.

As shown in FIG. 1, the loop resistance 28 appears substantially in parallel with capacitor C3, however, in the normal usage there are two series losses which are not shown in the drawing. These losses are attributed to a series resistor in the tip lead and a low pass ripple filter which is most often provided in the ring lead. The use of the filter results in an average DC loop voltage with a small ripple, and the average current in the subscriber loop equals the average current supplied by the secondary of transformer T1. By the use of a fixed cycle time (fixed frequency) system, as is employed in this invention, an average loop voltage for a given loop current is equivalent to a predetermined power requirement, and also to a proportionate amount of the energy stored in the primary winding at the time the transistor circuitry is switched off. Because the energy stored in the primary is proportional to primary current squared ($\frac{1}{2} LI^2$) and in turn to the control voltage, VC, the loop voltage (loop current) for a given loop resistance can be controlled at the primary side of transformer T1 by the voltage VC.

As noted hereinabove prior art techniques used either constant current methods or control techniques similar to those disclosed here but in each case additional transformer sense windings are required in order to provide the functions noted above. As the loop resistance increases the loop current will decrease somewhat; but in order to provide adequate loop current the actual loop voltage VL must increase which means that the voltage applied to the transformer secondary must be increased. In order to accomplish this result the energy stored in transformer T1 during the time that transistor circuit 12 is turned on must be increased. In order to accomplish this the voltage VC must reach the predetermined voltage level, but only after a longer time interval, thus increasing the energy stored in the transformer, which is subsequently translated into a higher secondary voltage during energy transfer. This higher secondary voltage causes a higher reflected voltage to be induced into the primary winding from the seccondary winding as the loop impedance increases.

When the loop resistance increases to a predetermined value, something in the order of 2800 ohms, the circuitry is designed to sense an on-hook condition. This is accomplished by the use of a peak detector 32 and a comparator 34. Capacitor C2 in peak detector 32 is initially charged to approximately 48 volts by the battery supply voltage, −48 volts, in conjunction with a fast recovery diode CR2. CR3 is a voltage breakdown diode which is used to fix the maximum operating voltage needed before an on-hook condition is sensed. In a practical implementation the breakdown voltage selected was 51 volts. At about 2800 ohms the voltage stored on capacitor C2 exceeds the breakdown voltage, 51 volts, of CR3. As the loop resistance further increases, the voltage across the voltage divider network consisting of resistors R10, R12 and R14 changes, and when the loop resistance reaches approximately 4500 ohms the output of the operational amplifier 34 changes from an open state, i.e., a high resistance, to an output of −5 volts. The effect of the −5 volt input is to limit the effect of the sync pulses from clock 4 by a gating action within the pulse width control circuit 8. This provides a pulse rate modulation of the transistor drive such that the power dissipation in the battery feed circuit is reduced significantly as the loop resistance approaches the on-hook condition. This is an immobilizing action and has been designated as "idle power shutdown" as the intent is to minimize total power dissipation in the on-hook state. Only enough of the sync pulses are now allowed to propagate through the control circuitry in order that on-hook to off-hook transistions might be identified.

Figure 2A:
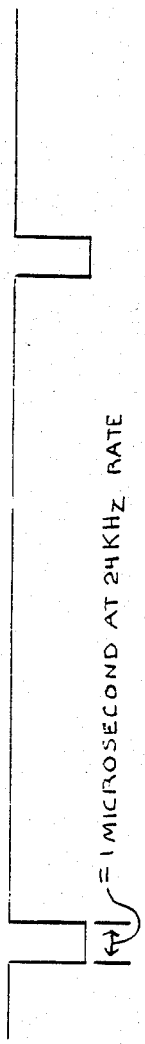
FIG. 2A is a waveform diagram showing the characteristic of the clock pulse input to pulse width control circuit 8.
Figure 2B:
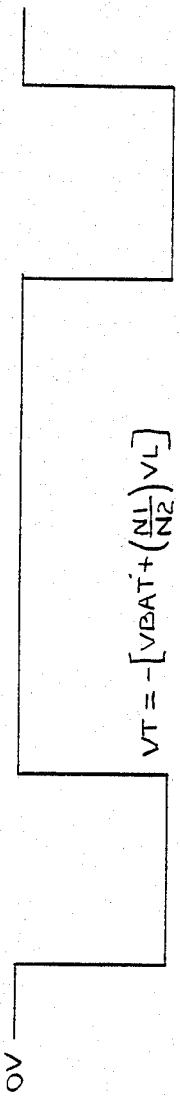
FIG. 2B is a waveform diagram showing the voltage characteristic VT between ground and the collector of the output transistor circuitry 12.

A more complete understanding of the operation of the pulse width converter may be obtained by referring to FIG. 1 in conjunction with the following discussion. The 24 kHz clock circuit 4 is shown only in block form but it may be implemented using a linear integrated circuit such as type number NE 555 or LM 555. Such devices are manufactured by National Semiconductor, Intersil and Signetics as well as others. The clock pulse output on path 6 is as shown in FIG. 2A and the pulse width is substantially one microsecond although it is anticipated that the clock pulse width may vary somewhat from that value, e.g., between 0.8–1.2 microseconds. Thus a single negative going pulse from the +5 volt to ground, and having a pulse width of 0.8–1.2 microseconds, is produced at a rate of 24 kHz by the 24 kHz clock circuit. The clock pulse frequency, as noted hereinabove, was chosen to be an integral multiple of the speech sampling frequency and thus could be synchronized to the 8 kHz channel frequency used for that purpose in a digital switching terminal. The reason for synchronizing the pulse to the channel frequency is to prevent any "beat frequency" effects which might arise from the converter, i.e., the pulse width control circuit 8. In the event that harmonics of the switching frequency are different from the 8 kHz sampling frequency, the beat frequencies from an unsynchronized clock source could unintentially be sampled by the 8 kHz sampling frequency and be digitized as in interferring audible signal within the voice frequency range.

The pulse width control circuitry 8 includes comparator 38 which has a reference level set by resistors R1 and R2 at 2.5 volts for an off-hook condition. As noted above in the off-hook condition, i.e., the loop impedance is less than that recognized as an on-hook state, operational amplifier 34 provides a high impedance input via path 36. This does not adversely affect the biasing arrangement at the inverting input to comparator 38. As noted hereinabove, in the on-hook state the clock pulses have been modulated such that they do not all pass through comparator 38 and an "idle power shutdown" condition is in effect. When an off-hook condition exists, the clock pulses are then allowed to freely pass through comparator 38.

In order to prevent the voltage at the non-inverting input of comparator 44 from rising above a predetermined level, bias resistors R3 and R4 are used. The effect of these resistors is to limit the pulse width which, in turn, limits the voltage that appears at node 16 when the transistor circuitry 12 goes out of saturation. In a practical implementation the voltage was limited to about −75 volts relative to ground. By so doing the loop supply current also is limited regardless of loop length. While not involved in this invention, it is important to note that the central office battery current into line 18 is separately limited as a safety measure and the manner in which this is done is well known. Comparator 44 and associated components provide three functions that are vital to the provision of a controlled current to the loop. One is that it acts as a latch in conjunction with diode CR1; two it acts as a comparator; and, three it acts as a pulse width modulator. Assume that transistor circit 12, i.e., Q2 and Q3, is turned off. The output of comparator 44 is high and this pulls its' non-inverting input terminal to about +3 volts via diode CR1. The input voltage at the non-inverting input of comparator 44 exceeds the threshold level of the inverting terminal, i.e., approximately −1 volt, so the positive feedback through diode CR1 keeps the comparator 44 output at +5 volts. Comparators are of the type which have NPN open collector outputs with the emitters returned to −5 volts. A linear integrated circuit such as an LM 339 manufactured by National Semiconductor may be employed. During this off-hook condition we assume that comparator 34 is off, which results in a high impedance at its output. Thus, the inverting input of comparator 38 is set to +2.5 volts by the equal-valued bias resistors R1 and R2.

Assuming that a negative clock pulse has passed through comparator 38, the non-inverting input of comparator 44 goes low which pulls the output low as well. Diode CR1 provides a latching function so that when the output changes this output state is held until a feedback control signal is applied to the inverting input. When the output of the comparator 44 goes low, transistor Q1 is turned on thereby providing base drive to the Darlington circuit configuration consisting of transistors Q2 and Q3 and associated components, which make up the transistor circuitry 12. With Q2 and Q3 biased on, current begins to flow in the primary winding N1 of trnsformer T1 as the collectors of the transistors are connected via path 14 and junction 16 to the primary winding N1 of transformer T1 and thence to the battery supply voltage via junction 18. While a single output transistor could be used the Darlington transistor configuration has been employed since it provides additional gain over the conventional single transistor switch thus minimizing switching losses associated with turning transformer T1 on and off.

During the time that transistors Q2 and Q3 are turned on, current is allowed to build up in the primary winding until the voltage across resistor R8 is sufficient to unlatch comparator 44. The current build up time is affected by loop length, i.e., resistance, because of the change in value of the voltage reflected from the secondary to the primary. Thus, the time for the voltage VC to reach a predetermined value will vary and this changes the time during which transistor Q2 and Q3 are turned on. Hence the pulse width is determined as the time between the latching of comparator 44 by the leading edge of the clock pulse and the feedback of the voltage developed across R8. When a predetermined voltage is reached, comparator 44 is unlatched, the transistor Q1 is turned off, which, in turn, turns off transistors Q2 and Q3. The interruption of current flow causes the stored energy to be transferred to the secondary winding of transformer T1 as the core flux of transformer T1 collapses. The amount of energy stored will vary with the pulse width established and is directly related to the loop voltage hence loop current. In the tip lead of the secondary circuit, rectifying diode CR4 feeds a storage capacitor C3 which receives the stored energy from the primary of transformer T1. The subscriber loop resistance is substantially in parallel with the capacitor C3 except, as noted above, for the two series losses consisting of a series resistor connected in the tip lead and the low pass ripple filter connected in the ring lead of the loop feed circuit.

Figure 2C:
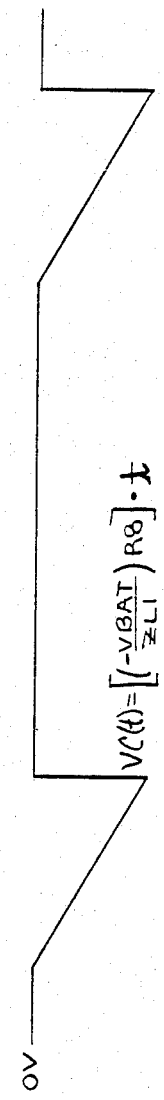
FIG. 2C is a waveform diagram illustrating the ramp characteristic of the voltage developed across the emitter resistor in the transistor circuit 12.
Figure 2D:
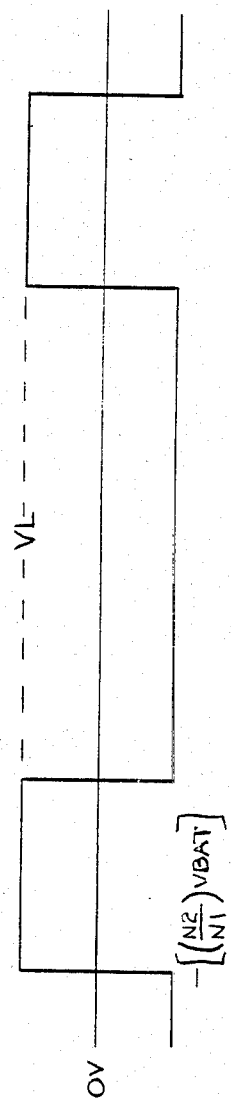
FIG. 2D is a voltage waveform diagram of the output voltage on the seondary winding of transformer T1.

As is apparent from the foregoing no separate sense winding is required in transformer T1 in order to provide the control information which permits the supply of a controlled current as required by the loop resistance. The design has been such that the loop current is not constant but gradually varies with loop resistance such that approximately 60 milliamperes flows on short loops, i.e., of about 100 ohms, and about 25 milliamperes on long loops, i.e., 2,000 ohms. By not having the loop current maintained at a constant value, power dissipation is kept low on the short loops without the necessity of adjusting transmission gains. The method of control is achieved by feeding back the voltage across resistor R8, i.e., the Q3 emitter resistor, to the inverting input of comparator 44. The voltage across resistor R8 is a negative ramp as shown in FIG. 2C and has an amplitude of about −1 volt peak. The width of the ramp, i.e., its' duration, is a function of the subscriber loop resistance. In practice the width of the ramp varies from about 6 microseconds for the short loops to 16 microseconds for the long loop lengths. The threshold voltage level at the non-inverting input of comparator 44 is set by choosing the appropriate scaling resistors R3 and R4. Of course this choice must be made in conjunction with the selection of the core and winding parameters. The core material used is of the ferrite linear type used in switching applications. In contrast to previously used control methods, which required additional sense windings to provide battery feed and "idle power down" conditions, only a two winding transformer is needed to provide these functions. Transformer T1 has a built-in sense winding in the form of the primary winding. The voltage appearing at point 16 during the time transistor circuit 12 is in the off state varies from about −48 volts dc for the short loop lengths to approximately −78 volts dc for the long loop lengths. The method for achieving a controlled loop current is by controlling the pulse width applied to circuit 12, i.e., the circuit 12 on-time.

By making the loop current a function of pulse width, voltage sense windings along with additional peak detectors and storage capacitors have been eliminated. By eliminating the voltage sense windings along with their feedback paths, a significant reduction in the number of components was obtained; but, in addition a controlled loop current, in accordance with the teachings of the invention, was still provided. Further, an improvement in performance has been achieved by this removal of the sense windings. Undershot, overshot, and ringing which results from switching of the Darlington transistor configuration is greatly reduced, because additional stray capacitance associated with the sense windings has been eliminated. It is well known that a transformer may be wound more symmetrically around the bobbin when only a single primary and single secondary are needed. This becomes significant in complying with FCC Rules, Part 68, Appendix B, Noise Interference Requirements. A balanced transformer reduces the conversion-frequency ripple associated with the battery feed clock. Only two components are needed to reduce both metallic and longitudinal frequency ripple below the −68 dbv as required by the FCC. Diode CR5 is used to provide symmetry on the secondary side of transformer T1 and capacitor C4 is used to compensate for the small amount of stray capacitance associated with the transformer. Previous methods used in reducing the conversion frequency ripple included using two or more capacitors, resistors and inductive chokes along with much more careful transformer design.

Referring now to the idle power shutdown circuitry it is to be noted that the primary winding of T1 also feeds a peak detector 32 consisting of a fast recovery diode CR2, resistor R9 and capacitor C2. The peak detector allows a negative voltage to be stored in capacitor C2. Initially this voltage is approximately equal to the battery voltage, i.e., −48 volts. As the loop resistance increases the loop voltage increases as well. When the loop resistance exceeds about 2800 ohms the breakdown voltage of the 51 volt breakdown diode CR3 is exceeded causing the voltage on line 58 to decrease. Resistors R10, R12 and R14 form a voltage divider network biased to +5 volts. As the loop resistance increases to approximately 4500 ohms, the voltage on line 58 decreases to such a value that line 61 becomes negative with respect to ground. This negative voltage on line 61 causes comparator 34 output to switch to its negative supply potential of −5 volts. As explained hereinabove this essentially shuts down the comparator 38 thereby reducing the power consumption and the power supplied to the secondary of transformer T1.

The on-hook, off-hook detection circuit consists essentially of peak detector 32, comparator 62 and voltage divider network resistors R10, R12 and R14. In the on-hook state the loop impedance is high causing the peak detector voltage to go negative. When the loop impedance exceeds about 3200 ohms, the output of comparator 62 switches to its negative supply potential of −5 volts. With the equal-valued voltage divider resistors R16 and R18 now connected between +5 volts and −5 volts, the output at the junction 64 is substantially 0 volts, i.e., at ground potential. With a loop resistance of less than 3200 ohms, the output from peak detector 32 is low enough so that the output of comparator 62 is a high impedance. In this case, the voltage at junction 64 is the supply value of +5 volts. It has been found that the sensitivity of this detection circuit is very good. A transition between off-hook and on-hook could be obtained for a change in loop resistance of from 3100 ohms to 3200 ohms. Further the response time is such that dial pulses can be correctly identified.

What is claimed is:

1. In a floating battery feed circuit for providing a controlled current to a telephone station set of a subscriber loop, supervisory and dial pulse detection apparatus comprising:

a primary dc power source having positive and negative output terminals, said positive output terminal being connected to ground;

a transformer having a primary and a secondary winding, one terminal end of said primary winding being connected to said negative output terminal of said primary dc power source;

a rectifier circuit, including a first storage capacitor, connected between first and second terminals of said secondary winding, the output of said rectifier circuit being adapted for connection to the tip and ring leads of said subscriber loop;

a clock source providing clock signals at predetermined time intevals at an output;

a pulse width control circuit having a first input receiving said clock signal and in response thereto providing a drive signal at an output thereof, and having a second input adapted to receive a feedback control signal;

a transistor circuit configuration having a first input connected to the other terminal end of said primary winding, and having a second input receiving said drive signal and in response thereto switching from an off to a saturation condition, and providing said feedback control signal to the second input of said pulse width control circuit so as to turn off the drive signal when the amplitude of said feedback control signal reaches a predetermined value, whereby energy is transferred from the primary of said transformer to the secondary, and reflected energy is transferred from the secondary winding to said primary winding; and means responsive to the reflected voltage from said secondary winding for identifying the telephone station set that is on-hook or off-hook;

said identifying means comprising means for establishing a threshold voltage level above which an on-hook condition is identified and below which an off-hook condition is identified; and comparing means responsive to the output of said threshold level means whereby status of the subscriber loop is supplied to a local switching office; and said means for establishing a threshold voltage level comprising a peak detector having one input terminal connected to the other terminal end of said primary winding and including a second storage capacitor for storing the reflected voltage; and a voltage breakdown diode having an anode which is connected to one terminal end of said second storage capacitor to provide the desired threshold level and thus establish the identification of on-hook or off-hook states, which results from the different voltage levels being reflected from the secondary winding to the primary winding.

2. Apparatus as set forth in claim 1 wherein said peak detector further comprises:

a fast recovery diode having the cathode terminal connected to said other terminal of said transformer primary winding, and anode connected to said one terminal of said second capacitor and to the anode of said breakdown diode;

said storage capacitor having the other terminal thereof connected to ground.

3. Apparatus as set for in claim 2 wherein said comparing means comprises:

a first voltage divider network having one end thereof connected to a voltage source, having the other end connected to the cathode of said breakdown diode and having a first junction terminal therebetween;

a comparator having an inverting terminal connected to said first voltage divider junction terminal, having a non-inverting terminal connected to ground, and having an output terminal; and a second voltage divider network having one terminal end connected to said voltage source, having the other end connected to said comparator output terminal, and providing supervision information at a second junction terminal intermediate thereof.

* * * * *